United States Patent
Wisniewski et al.

(10) Patent No.: US 6,179,362 B1
(45) Date of Patent: Jan. 30, 2001

(54) VEHICLE UTILITY SEAT

(75) Inventors: Chester R. Wisniewski; Daniel J. Koester, both of Holland, MI (US)

(73) Assignee: Johnson Controls Technology Company, Plymouth, MI (US)

(*) Notice: Under 35 U.S.C. 154(b), the term of this patent shall be extended for 0 days.

(21) Appl. No.: 09/140,181

(22) Filed: Aug. 26, 1998

(51) Int. Cl.$^7$ .................................................. B60N 2/24
(52) U.S. Cl. ...................... 296/65.01; 296/65.02; 296/65.05; 296/65.09; 296/65.16; 297/312; 297/313; 297/335; 297/337; 297/378.1; 297/468
(58) Field of Search ................ 296/65.01, 65.09, 296/65.02, 65.16, 66, 65.05; 297/331, 312, 313, 335, 337, 378.1, 468, 485

(56) References Cited

U.S. PATENT DOCUMENTS

| | | | |
|---|---|---|---|
| D. 330,639 | * 11/1992 | Munro et al. ..................... D6/335 |
| 2,418,787 | * 4/1947 | Nelson . | |
| 4,198,092 | * 4/1980 | Federspiel . | |
| 4,527,828 | 7/1985 | Groce et al. . | |
| 4,699,418 | * 10/1987 | Plavetich ........................ 296/65 R |
| 4,779,917 | 10/1988 | Campbell et al. . | |
| 4,793,649 | 12/1988 | Yamano et al. . | |
| 5,123,673 | * 6/1992 | Tame ............................... 280/801 |
| 5,460,426 | * 10/1995 | Tribelsky et al. ................ 297/17 |
| 5,492,386 | 2/1996 | Callum . | |
| 5,498,052 | 3/1996 | Severini et al. . | |
| 5,529,378 | 6/1996 | Chaban et al. . | |
| 5,702,145 | 12/1997 | Fowler et al. . | |
| 5,730,495 | 3/1998 | Tuman, II . | |
| 5,902,009 | * 5/1999 | Singh et al. .................... 297/188.1 |
| 5,908,219 | * 6/1999 | Bohmler ......................... 297/216.1 |

* cited by examiner

Primary Examiner—D. Glenn Dayoan
Assistant Examiner—Mickki D. Murray
(74) Attorney, Agent, or Firm—Foley & Lardner

(57) ABSTRACT

A vehicle utility seat in which the seat back can be rotated down onto the seat bottom to form a pass through opening into the trunk area of the vehicle. In addition, the seat bottom can be rotated upward to a stowed position immediately in front of the seat back providing increased cargo area in the rear seat area. A flat load floor is provided beneath the seat bottom for placing cargo thereon. The seat bottom and seat back are formed with complementary seating surfaces so that the seat bottom and seat back can nest together and occupy a minimal volume in the vehicle to maximize the cargo carrying capacity of the vehicle. In addition, the seat bottom and seat back are mounted to the vehicle for rotation about a common pivot axis.

15 Claims, 3 Drawing Sheets

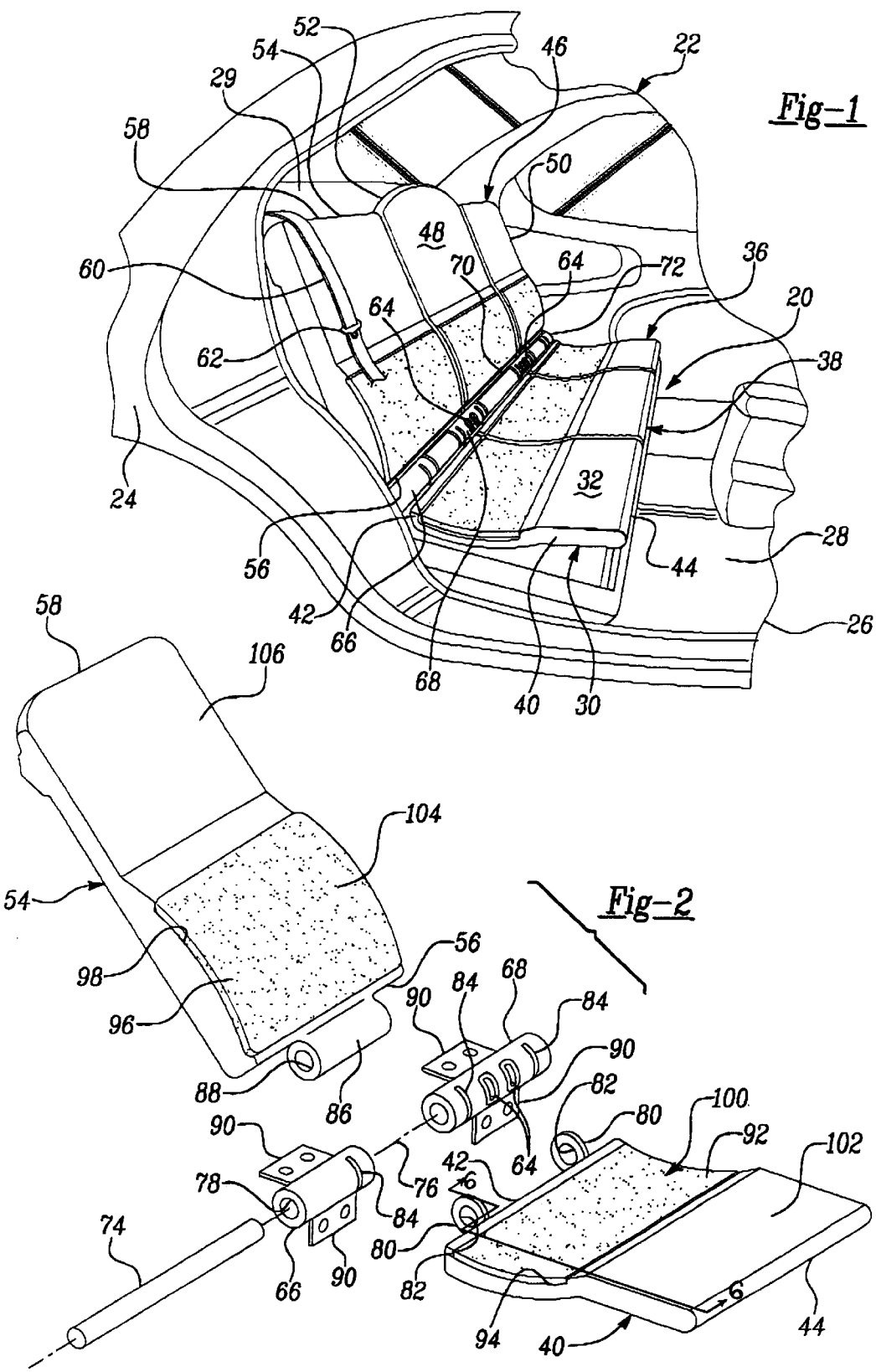

VEHICLE UTILITY SEAT

BACKGROUND OF THE INVENTION

The present invention relates to a vehicle seat and in particular to a utility seat for a motor vehicle which is designed not only to carry passengers within the vehicle but also to facilitate the carrying of cargo within the motor vehicle.

Motor vehicle manufacturers are becoming increasingly aware of the need to provide increased utility in motor vehicles. Part of this awareness involves a recognition that motor vehicles, such as passenger cars, are used not only to carry passengers but also to carry cargo. Studies have indicated that the rear seat area of a passenger car is used more often to carry cargo than it is used to carry passengers.

It is well know to provide vehicle seats in which the seat back of the rear vehicle seat can be rotated forward, from its upright use position, to a stowed position resting upon the seat cushion. This opens the rear seat area of the vehicle to the trunk area, allowing larger items to be placed in the trunk which extend forward into the passenger compartment and rest upon the rear surface of the stowed seat back. This is one example of a seat which is designed not only for passengers, but also for cargo.

It is an object of the present invention to provide a vehicle seat which offers increased utility, beyond a fold down seat back, to provide greater ease and convenience in carrying cargo or passengers.

SUMMARY OF THE INVENTION

The seat of the present invention expands upon the utility offered by a fold down seat back by providing a seat bottom which rotates up to stowed position immediately in front of the upright seat back. This opens the entire rear seat area for carrying cargo which the vehicle user does not wish to carry in the trunk or which is not so large that it must be carried in the trunk. In addition, more room is available for cargo which a user does not want in the trunk or on the seat bottom such as milk jugs or potted plants which could soil the seat.

Additional utility is provided by a flat load floor below the seat cushion. The flat load floor is revealed when the seat bottom is rotated to the upright stowed position.

To maximize the cargo carrying capacity of the vehicle, the seat bottom and the seat back are made as thin as possible to reduce the volume occupied by the seat, thereby increasing the volume available for cargo. This is accomplished by forming the seat bottom and seat back out of thin panels of metal or plastic. This avoids the need for a metal frame, a suspension system and a separate foam pad supported thereon. The plastic or metal panels can also have thin pads attached thereto which form a part or all of the seating surface of the seat bottom and seat back for passenger comfort.

The volume occupied by the seat back and seat bottom when stowed is further minimized by providing seating surfaces for the seat back and the seat bottom which are complementary in shape to one another. This enables the seating surfaces to be in contact over substantially the entire seating surface rather than having a "high point" on the seat bottom engage a "high point" in the seat back with the remaining areas of the seating surfaces spaced from one another.

The volume occupied by the seat is further minimized by mounting the seat bottom and seat back to the vehicle body for rotation about a common pivot axis. This reduces the size of the mounting and pivoting mechanisms for the seat bottom and seat back.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of the seat of the present invention shown within a motor vehicle;

FIG. 2 is an exploded perspective view of a portion of the seat of the present invention;

DETAILED DESCRIPTION OF THE PREFERRED EMBODIMENT

Figure 3:
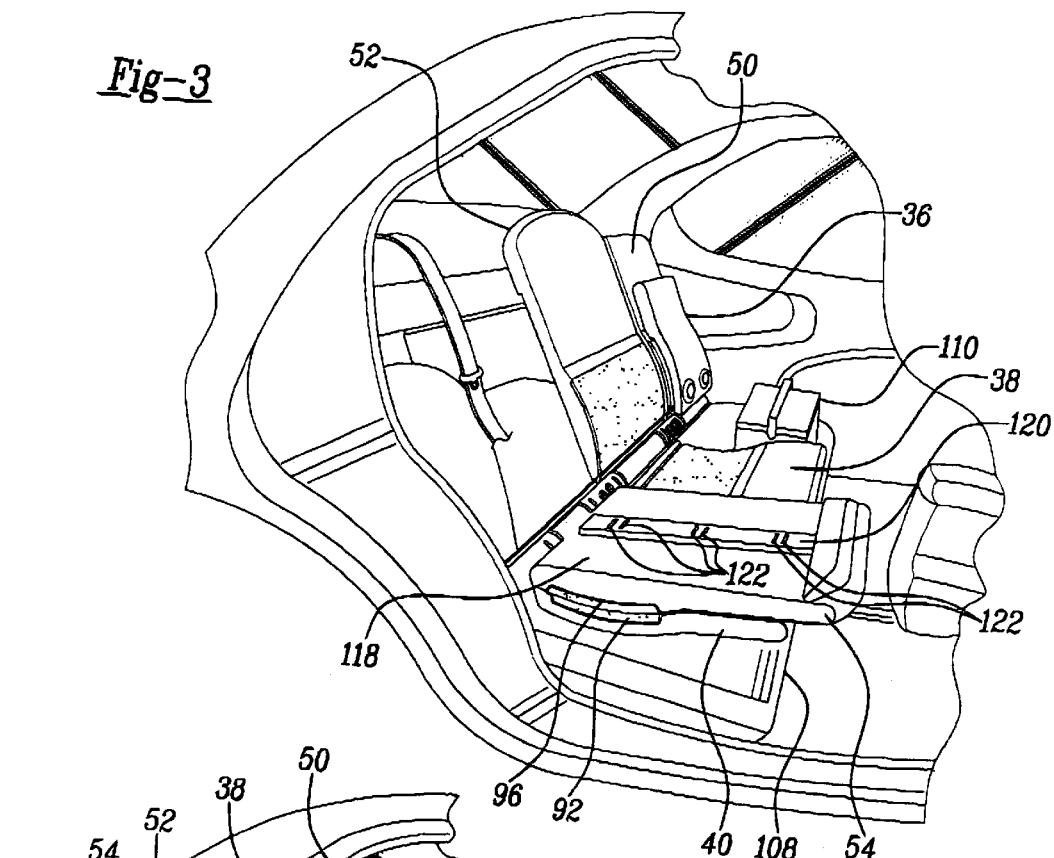
FIG. 3 is a perspective view of the seat of the present invention, similar to FIG. 1, in which one panel of the seat back has been rotated downward to a stowed position while one panel of the seat bottom has been rotated upward to a stowed position.

With reference to FIG. 1, the seat 20 of the present invention is shown within a vehicle 22. The vehicle 22 has a body 24 and is a sedan type of vehicle. The invention, however, is not limited to use within a sedan type vehicle. The vehicle body 24 includes a floor pan 26 which forms a foot well 28 forward of the seat 20. The body 24 further includes a rear shelf 29 immediately behind the seat back as described below.

The seat 20 includes a seat bottom 30 which is shown in FIG. 1 in a generally horizontal use position. The seat bottom 30 has an upper seating surface 32 which a seat occupant engages when seated on the seat 20. The seat bottom 30 is formed by three separate seat bottom panels; a left outboard panel 36, a center panel 38 and a right outboard panel 40. The seat bottom panels each have a rear end 42 and a front end 44.

The seat 20 further includes a seat back 46 which is shown in FIG. 1 in a generally upright use position. The seat back 46 has a front seating surface 48 which is engaged by a seat occupant when seated on the seat 20. Like the seat bottom 30, the seat back 46 is formed by a left outboard panel 50, a center panel 52 and a right outboard panel 54. The seat back panels each have a lower end 56 and an upper end 58. The upper ends 58 of the seat back panels are generally adjacent to the rear shelf 29 of the vehicle body when the seat back panels are in their upright use positions. The seat back panels are latched to the structure of the shelf 29 and/or to the vehicle body on the outboard sides of the seat back. The latches are not shown but are known features in seat backs which fold down.

Figure 6:
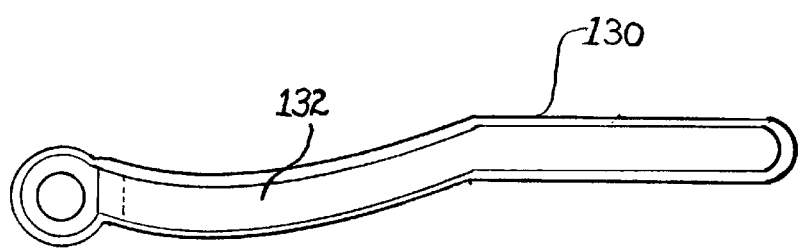
FIG. 6 is a sectional view of a seat panel as seen from substantially the stepped section line 6—6 in FIG. 2.

The seat bottom panels 36, 38, 40 and the seat back panels 50, 52, 54 are made of metal or plastic bodies. The metal bodies may be stamped steel, cast aluminum, magnesium, titanium or other metals which provide the required support. Plastic bodies can be injection or blow molded of a variety of resins, plastics, or other materials appropriate for such processes. A plastic body 130 is shown in FIG. 6. A metal insert 132 is attached to the plastic body for added strength. The metal insert 132 may be insert molded within the plastic body 130 or may be separately formed and attached.

The seat 20 further includes restraints for seat occupants. The restraints include belts 60 which have one end anchored to the vehicle body at the two sides of the seat 20. The belts extend upwardly to the shelf 29 and are attached to the shelf structure through a webbing retractor in a known manner or are attached to the vehicle body. The belts 60 each carry a tongue 62 which is inserted into a buckle 64 described in greater detail below. When the tongue is inserted into the buckle, belt webbing is withdrawn from the retractor and forms a lap and shoulder belt for the outboard seat occupants.

The seat bottom panels 36, 38, 40 and the seat back panels 50, 52, 54 are mounted in the vehicle body 24 for rotation between use and stowed positions. The seat 20 includes multiple fixed pivot supports 66, 68, 70 and 72 spaced across the vehicle at the rear end of the seat bottom 30 and at the lower end of the seat back 46. The fixed pivot supports 66, 68, 70, 72 support one or more pivot pins 74 which extend across the vehicle and define a pivot axis 76 for the seat bottom 30 and the seat back 46. The fixed pivot supports 66, 68, 70, 72 each include a center bore 78 which receives the pivot pin(s) 74. The seat bottom panels, as illustrated by the seat bottom panel 40 shown in FIG. 2, include a pair of rearwardly extending mounting flanges 80 each having an aperture 82 therethrough. The mounting flanges 80 are disposed within slots 84 in the fixed pivot supports 66, 68 with the center apertures 82 of the mounting flanges 80 aligned with the center bores 78 of the fixed pivot supports 66, 68.

The seat back panels, as illustrated by the seat back panel 54, are formed with a cylindrical mounting boss 86 at the lower end 56. The cylindrical mounting boss 86 has a center bore 88. The cylindrical mounting boss 88 is disposed between the two spaced fixed pivot supports 66, 68 with the center bore 88 aligned with the center bores 78 of the adjacent fixed pivot supports 66, 68. The mounting pin 74 is inserted through the center bores 78 of the fixed pivot supports 66, 68, the center apertures 82 of the seat bottom panel 40 and the center bore 88 of the back panel 54 to rotatably attach the seat bottom panel 40 and seat back panel 54 to the fixed pivot supports 66, 68. The fixed pivot supports 66, 68, 70, 72 are attached to the vehicle body 24 by mounting brackets 90. The result is attachment of the seat bottom panels 36, 38, 40 and the seat back panels 50, 52, 54 to the vehicle body for rotation about the pivot axis 76.

The other seat bottom panels 36, 38 and the other seat back panels 50, 52 are similarly attached to the fixed pivot supports 68, 70 and 72. While the seat bottom panels 36, 38, 40 have been shown as being attached by the mounting flanges 80 and while the seat back panels 50, 52, 54 have been shown as being attached by the cylindrical mounting bosses 86, it will be appreciated that the cylindrical mounting bosses 86 can be placed on the seat bottom panels while the mounting flanges 80 can be placed on the seat back panels. Alternatively, all the seat bottom and seat back panels can be attached by mounting flanges 80 or cylindrical mounting bosses 86.

The seat belt buckles 64 are mounted to the fixed pivot supports 68, 70 and through the mounting brackets 90 to the vehicle body 24. Seat belt buckles 64 are thereby held in position in the bite line of the seat 20. For the center seat occupant, one buckle 64 is provided on the fixed pivot support 68 while a belt tongue 62 is mounted to the fixed pivot support 70. The tongue 62 is coupled to webbing and retractor (not shown) to be pulled over the center occupant's lap and secured in the buckle 64 on the other side of the occupant to form a lap belt.

The seat bottom panels 36, 38, 40 each include a pad 92 which forms a portion of upper seating surface 32 of the seat bottom 30. The pads 92 are disposed within a shallow recess 94 in the seat bottom panels 36, 38, 40 whereby the thickness of the seat bottom panels is minimized. Likewise, the seat back panels 50, 52, 54 include pads 96 which form a portion of the front seating surface 48 of the seat back panels. The pads 96 are also disposed in a shallow recess 98 in the seat back panels. It will be appreciated that larger pads could be used forming the entire seating surfaces 32, 48 of the seat bottom 30 and seat back 46.

The upper seating surface 32 of the seat bottom 30 has a slightly concave rear portion 100 and a generally planar front portion 102. The concave rear portion 100 is generally in the area of a seat occupant's buttocks. The front seating surface 48 of the seat back 46 is formed with a slightly convex lower portion 104 and a generally planar upper portion 106. The convex lower portion 104 is generally in the lumbar region of a seat occupant's back. The contours of the seat bottom 30 and seat back 46 with the planar, convex and concave portions as described are complementary to one another. Thus when the panels are rotated together, as shown in FIG. 3 with the right outboard seat back panel 54 rotated to a generally horizontal position upon the right seat bottom panel 40, the two complementary seating surfaces 32, 48 nest with one another. The seating surfaces 32, 48 are in substantial surface to surface contact over the entire area of the smaller of the two seating surfaces 32, 48 rather than contacting at high points and leaving gaps between the seating surfaces at other locations. As shown in FIG. 3, the front seating surface 48 of the seat back panel 54, when the panel 54 is in a stowed position, is in confronting juxtaposition with the upper seating surface 32 of the seat bottom panel 40.

One or more of the seat back panels 50, 52, 54 can be rotated down to a generally horizontal stowed position as shown in FIG. 3 with the right outboard seat back panel 54. Alternatively, the seat bottom panels 36, 38, 40 can be rotated upwardly to upright stowed positions immediately in front of the seat back panels as shown by the left outboard seat bottom panel 36 in FIG. 3 and with all of the seat bottom panels 36, 38, 40 in FIG. 4. With the seat bottom panels rotated upwardly to stowed positions, the upper seating surface 32 of the seat bottom panels is in confronting juxtaposition with the front seating surface 48 of the seat back panels.

Beneath the seat bottom 30, the seat includes a load floor 108. Preferably, the load floor 108 is planar and generally horizontal so that cargo can be placed thereon, such as the cooler 110 shown in FIG. 3. The load floor 108 includes a recessed portion 112. This facilitates retention of cargo on the load floor 108 by providing an upright raised lip 114 at the front of the load floor 108. The load floor 108 is preferably a separate component attached to the vehicle body. Alternatively, the load floor 108 could be a component of the body 24 itself.

Figure 4:
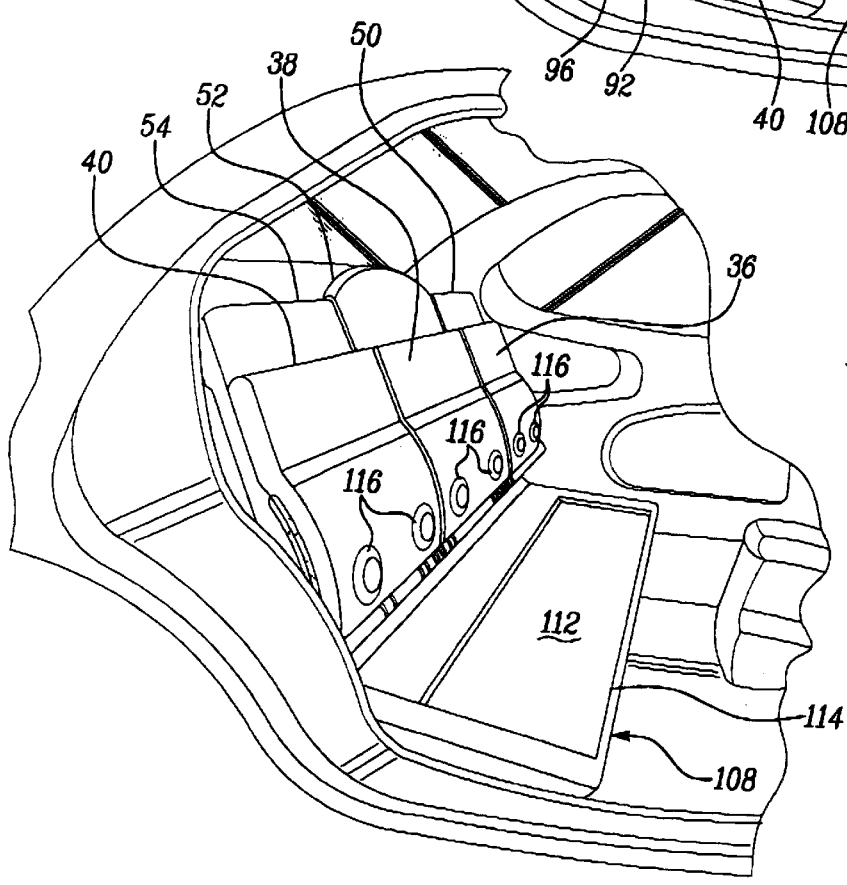
FIG. 4 is a perspective view of the seat of the present invention with all of the panels of the seat bottom rotated upward to stowed positions revealing the flat load floor beneath the seat bottom.

As shown in FIG. 4, support members 116 are provided on the lower side of the seat bottom panels 36, 38, 40. The support members 116 are preferably made of rubber or other resilient polymeric material. In addition to supporting the seat bottom panels, 36, 38, 40 upon the load floor, the supports 116 provide vibration isolation between the vehicle body 24 and the seat bottom panels. The seat bottom panels 36, 38, 40 are essentially cantilevered forward from the support members 116 and do not contact the load floor 108 forward of the support members 116.

With reference once again to FIG. 3, the rear surface 118 of the seat back panel 54 is shown. The rear surface of the panel 54 is formed with a raised ridge 120 extending longitudinally in direction between the lower end 56 to the upper end 58 of the seat back panel. The raised ridge 120 can be aligned with similar ridges in the floor of the vehicle trunk, rearward of the seat 20 to provide a sliding surface for cargo being placed in the trunk, such as sheets of plywood, suitcases or large boxes. In addition to providing a sliding contact surface for cargo, the ridge 120 is provided with pairs of spaced slots 122. These spaced slots are tie down openings which can be used to attach a tie down member such as a bungee cord, a strap, rope, etc, for securing cargo within the vehicle.

The load floor 108 beneath the seat bottom 30 can be equipped with various securement devices for securing cargo or other objects to the load floor. The securement device can be similar to the space slots 122 shown on the back surface of the seat back panels 50, 52, 54. Other securing devices could be used such as a seat belt buckle-type mechanism which receives a tongue from a cargo carrier or other device such as a child seat or a removable armrest module, etc. Such an armrest module could be attached to the center of the vehicle seat with the center seat bottom panel 38 rotated to the stored position thereby providing an armrest for the outboard seat occupants. In addition, a laterally extending track can be formed in the load floor enabling removable modules to be slid across the vehicle and positioned at desired locations along the width of the load floor 108. Locking pins, T-nuts, bayonet fasteners, and other devices could be used to lock the modules, etc. to the load floor and track.

Figure 5:
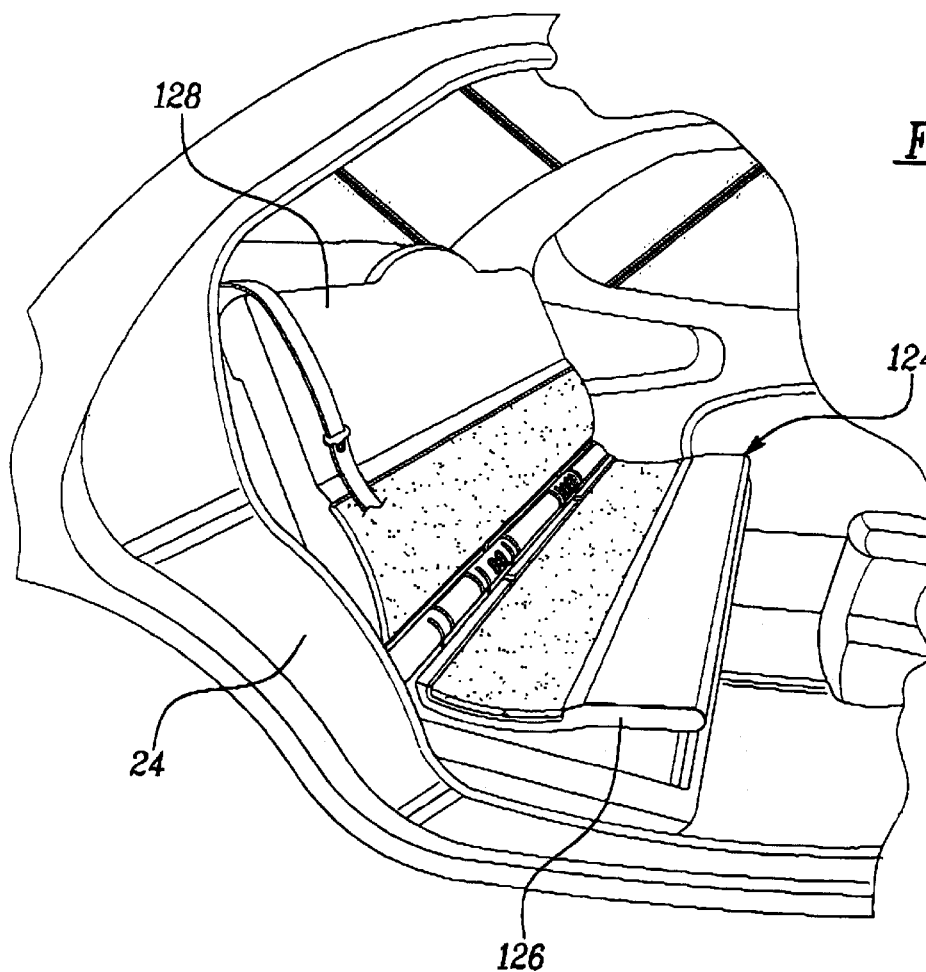
FIG. 5 is a perspective view of another embodiment of the seat of the present invention with the seat bottom and the seat back made of a single panel.

With reference to FIG. 5, an alternative embodiment of the seat of the present invention is shown and designated at 124. Seat 124 is identical with the seat 20 except that the seat bottom 126 is formed by a single panel and seat back 128 is formed by a single panel. The panels are attached to fixed pivot supports via mounting flanges and cylindrical mounting bosses similar to that described above. The seat of the present invention can have any number of panels. Furthermore, the width of the panels can vary from the seat 20 shown in FIG. 1. There, the panels are each one third of the width of the seat 20 forming a 33/33/33 split bench seat. The seat could be split in other ways, such as, but not limited to, a 40/20/40 or 60/40 split. The invention can also be used in a bucket seat as opposed to a bench seat.

The utility vehicle seat of the present invention not only provides seating for vehicle occupants but also provides convenience and flexibility for carrying cargo within the motor vehicle. The ability to fold the seat bottom upward to an upright stowed position adjacent to the seat back, together with the horizontal load floor beneath the seat bottom, provides added ease and convenience for carrying cargo in the back seat of a motor vehicle.

It is to be understood that the invention is not limited to the exact construction illustrated and described above. But that various changes and modifications may be made without departing from the spirit and scope of the invention as defined in the following claims.

We claim:

1. A seat for use in a vehicle body, said seat comprising:
   a seat bottom panel having a generally horizontal use position within the vehicle body in which an upper surface of said seat bottom panel forms a seat bottom seating surface for engagement by a seat occupant, said seat bottom panel having a front and a rear end and a first mounting member;
   a seat back panel having a generally upright use position within the vehicle body in which a front surface of said seat back panel forms a seat back seating surface for engagement by a seat occupant, said seat back panel having an upper and a lower end and a second mounting member; and
   at least one fixed pivot support fixed to the vehicle body and at least one pivot defining a pivot axis supported by said at least one fixed pivot support, said at least one fixed pivot support including at least one slot operable to receive at least one of said first mounting member and said second mounting member such that said seat bottom panel is operable to rotate about said pivot axis from said seat bottom panel use position to an upright seat bottom panel stowed position in which said seat bottom seating surface is in confronting juxtaposition with said seat back seating surface and said seat back panel is operable to rotate about said pivot axis from said seat back panel use position to a generally horizontal seat back panel stowed position overlying said seat bottom panel in which said seat back seating surface is in confronting juxtaposition with said seat bottom seating surface.

2. The seat as defined in claim 1 further comprising a seat belt buckle mounted to one of said at least one fixed pivot support for reception of a seat belt tongue therein.

3. The seat as defined in claim 2 further comprising a seat belt tongue operable to be inserted into said seat belt buckle.

4. The seat as defined in claim 1 wherein said seating surfaces of said seat bottom panel and said seat back panel are complementary with one another.

5. The seat as defined in claim 4 wherein said seat bottom seating surface has a concave rear portion adjacent said rear end of said seat bottom panel and a planar front portion adjacent said front end of said seat bottom panel; and
   said seat back seating surface has a convex lower portion adjacent said lower end of said seat back panel and a planar upper portion adjacent said upper end of said seat back panel whereby when said seating surfaces are in confronting juxtaposition with one another said convex portion of said seat back seating surface nests within said concave portion of said seat bottom seating surface and said planar portions of said seating surfaces confront one another.

6. The seat as defined in claim 1 further comprising a generally horizontal load floor attached to the vehicle body beneath said seat bottom panel upon which cargo can be placed when said seat bottom panel is in said seat bottom panel upright stowed position.

7. The seat as defined in claim 1 further comprising multiple seat bottom panels adjacent one another with each of said seat bottom panels being separately movable between seat bottom panel use positions and upright seat bottom panel stowed positions.

8. The seat as defined in claim 1 further comprising multiple seat back panels adjacent one another with each of said seat back panels being separately movable between upright seat back panel use positions and seat back panel stowed positions.

9. The seat as defined in claim 1 further comprising a pad mounted to one of said seat bottom panel and said seat back panel forming at least part of said seating surface of said one of said seat bottom panel and said seat back panel.

10. The seat as defined in claim 1 wherein said first mounting member includes at least one mounting flange extending from said rear end of said seat bottom panel, said at least one mounting flange operable to engage said at least one slot of said at least one fixed pivot support.

11. The seat as defined in claim 1 wherein said at least one fixed pivot support extends across the vehicle body.

12. The seat as defined in claim 1 wherein said at least one fixed pivot support includes at least one center bore, said at least one center bore being operable to receive at least one mounting pin.

13. The seat as defined in claim 1 wherein said second mounting member includes at least one mounting flange extending from said rear end of said seat bottom panel, said at least one mounting flange operable to engage said at least one slot of said at least one fixed pivot support.

14. The seat as defined in claim 1 wherein said first mounting member includes at least one mounting boss extending from said lower end of said seat back panel, said at least one mounting boss operable to engage said at least one slot of said at least one fixed pivot support.

15. The seat as defined in claim 1 wherein a plurality of spaced apart fixed pivot supports extend across the vehicle body.

* * * * *